(12) United States Patent
Young (10) Patent No.: US 11,972,700 B1
(45) Date of Patent: Apr. 30, 2024

(54) ADJUSTABLE MOUNT FOR JOYSTICK IN FLIGHT SIMULATOR

(71) Applicant: MVRsimulation, Inc., Sudbury, MA (US)

(72) Inventor: Brian Young, Fayetteville, AR (US)

(73) Assignee: MVRsimulation Inc., Sudbury, MA (US)

(*) Notice: Subject to any disclaimer, the term of this patent is extended or adjusted under 35 U.S.C. 154(b) by 242 days.

(21) Appl. No.: 17/374,338

(22) Filed: Jul. 13, 2021

(51) Int. Cl.
| | | |
|---|---|---|
| G09B 9/08 | | (2006.01) |
| G05G 5/04 | | (2006.01) |
| G05G 5/08 | | (2006.01) |
| G05G 9/047 | | (2006.01) |

(52) U.S. Cl.
CPC .......... G09B 9/08 (2013.01); G05G 5/04 (2013.01); G05G 5/08 (2013.01); G05G 9/047 (2013.01); G05G 2009/04703 (2013.01)

(58) Field of Classification Search
CPC ... G09B 9/08; G09B 9/02; G09B 9/04; G05G 2009/04703; G05G 9/047
USPC ................................................ 434/40; 703/8
See application file for complete search history.

(56) References Cited

U.S. PATENT DOCUMENTS

| | | | | |
|---|---|---|---|---|
| 5,022,706 A | * | 6/1991 | Bryan ...................... | A47C 9/02 |
| | | | | 297/145 |
| 5,129,826 A | | 7/1992 | Munsch | |
| 5,470,232 A | | 11/1995 | Kelso et al. | |
| 5,653,499 A | * | 8/1997 | Goodall ................ | A47B 83/02 |
| | | | | 297/173 |
| 5,911,634 A | * | 6/1999 | Nidata ...................... | G09B 9/12 |
| | | | | 472/59 |
| 6,142,559 A | * | 11/2000 | Sorel ........................ | A47C 7/68 |
| | | | | 297/411.27 |
| 6,851,950 B1 | * | 2/2005 | Gamnig ................... | G09B 9/08 |
| | | | | 434/30 |
| 7,407,439 B1 | | 8/2008 | Ochoa | |
| 7,662,042 B2 | * | 2/2010 | Oswald ................ | A63F 13/803 |
| | | | | 463/31 |
| 7,717,711 B2 | * | 5/2010 | MacDonald ............. | G09B 9/08 |
| | | | | 434/55 |
| 9,026,312 B2 | * | 5/2015 | Smith ....................... | E02F 9/16 |
| | | | | 434/62 |

(Continued)

FOREIGN PATENT DOCUMENTS

WO       WO-0065961 A1 * 11/2000 ............... A47C 7/70

OTHER PUBLICATIONS

Playseat, Playseat Air Force, https://www.amazon.com/Playseat-FA-00036-Playseat%C2%AE-Air-Force/dp/B002IXC8NO/ref=sr_1_3?crid=2AUQS0YF9BGHB&keywords=playseat+air+force&qid=1690815116&sprefix=playseat+air+forc%2Caps%2C110&sr=8-3, Available Jul. 24, 2009 (Accessed Jul. 31, 2023) (Year: 2009).*

(Continued)

*Primary Examiner* — Jay Trent Liddle
*Assistant Examiner* — Alyssa N Brandley
(74) *Attorney, Agent, or Firm* — Sunstein LLP (57) ABSTRACT

An adjustable control structure for a flight simulator includes a chair having a support frame and a seat. The adjustable control structure further includes a mounting arm having a first end and a second end, the first end of the mounting arm rotatably coupled to the support frame by a first coupling mechanism. The adjustable control structure also includes a mounting platform rotatably coupled to the second end of the mounting arm by a second coupling mechanism. The mounting platform is configured to receive a flight control instrument.

12 Claims, 9 Drawing Sheets

(56) References Cited

U.S. PATENT DOCUMENTS

| | | | | |
|---|---|---|---|---|
| 2004/0085295 | A1* | 5/2004 | Cowen | A61G 5/04 345/161 |
| 2010/0255915 | A1 | 10/2010 | Spradley | |
| 2011/0031785 | A1* | 2/2011 | Steenson | A47C 7/543 297/161 |
| 2011/0065067 | A1* | 3/2011 | Tanaka | A63F 13/24 434/29 |
| 2012/0068504 | A1* | 3/2012 | Ting | F16M 13/00 297/135 |
| 2018/0136687 | A1* | 5/2018 | Lee | G09B 9/28 |
| 2021/0100365 | A1* | 4/2021 | Pavlov | A47C 7/70 |

OTHER PUBLICATIONS

MagicHold, Ergonomic Keyboard Laptop Tablet Mouse Stand Holder Mount for Workstation Video Gaming, Silver, https://www.amazon.com, Available Apr. 10, 2017 (Accessed Jul. 31, 2023)—(Year: 2017).*
https://www.amazon.com/Magichold-Ergonomic-Workstation-Installed-Thickness/dp/B0774WZ7X2/ref=asc_df_B0774WZ7X2/?tag=hyprod-20&linkCode=df0&hvadid=242010397888&hvpos=&hvnetw=g&hvrand=594299407843572367&hvpone=&hvptwo=&hvqmt=&hvdev=c&hvdvcmdl=&hvlocint=&hvlocphy=1014895&hvtargid=pla-412443053926&th=1 (Year: 2017).*
Playseat Store, Playseat Air Force introduction by Playseat Store, https://www.youtube.com/watch?v=9ZYXNJxf56E, Available May 20, 2014 (Accessed Aug. 7, 2023). (Year: 2014).*
GameFeed, Playseat FA.00036 FlightSeat Overview—Newegg Arcade, https://www.youtube.com/watch?v=WfDQBe5uq2U, Available Jan. 20, 2014 (Accessed Aug. 7, 2023). (Year: 2014).*
Playseat; https://www.playseatstore.com/playseat-air-force.html (7 pages).

* cited by examiner

ADJUSTABLE MOUNT FOR JOYSTICK IN FLIGHT SIMULATOR

TECHNICAL FIELD

The present invention relates to control mounts for flight simulators, and more particularly to an adjustable mount for a flight control instrument such as a joystick in a flight simulator that can be rotated and fixed in a plurality of positions.

BACKGROUND ART

For many reasons, including cost and safety, fighter jet pilots often train in flight simulators instead of actual fighter jet aircraft. Different fighter jets, or different generations of fighter jets, have different cockpit configurations. For example, one jet may have the main flight control instrument, the joystick, located in the center between the legs of the pilot. Another jet may have the joystick located on the right side of the pilot. A training facility may train pilots for both cockpit configurations. However, current flight simulators require a lengthy reconfiguration when the simulator needs to be switched from simulating a jet with a center joystick to a jet with a side joystick or vice versa. A control structure that allows for easier reconfiguration of flight control instruments is needed.

SUMMARY OF THE EMBODIMENTS

The deficiencies of the prior art are overcome by providing an adjustable control structure for a flight simulator that supports side stick and center stick configurations without interrupting pilot training for the need of a lengthy reconfiguration of the simulator.

In accordance with one embodiment of the invention, an adjustable control structure for a flight simulator includes a chair having a support frame and a seat. The adjustable control structure further includes a mounting arm having a first end and a second end, the first end of the mounting arm rotatably coupled to the support frame by a first coupling mechanism. The adjustable control structure also includes a mounting platform rotatably coupled to the second end of the mounting arm by a second coupling mechanism. The mounting platform is configured to receive a flight control instrument.

Alternatively or in addition, the first coupling mechanism is configured to rotate the mounting arm around an axis substantially normal to a major axis of the seat.

Also alternatively or in addition, the second coupling mechanism is configured to rotate the mounting platform around an axis substantially normal to a major axis of the mounting arm.

Alternatively or in addition, the first coupling mechanism includes a locking member having a locked position, the locking member configured to prevent rotation of the mounting arm if the locking member is in the locked position, and to allow rotation of the mounting arm if the locking member is not in the locked position.

Further, alternatively or in addition, the second coupling mechanism includes a locking member having a locked position, the locking member configured to prevent rotation of the mounting platform if the locking member is in the locked position, and to allow rotation of the mounting platform if the locking member is not in the locked position.

In a related embodiment, the first coupling mechanism includes a planar joint. Alternatively or in addition, the second coupling mechanism includes a planar joint Alternatively or in addition, the flight control instrument is a joystick. Also alternatively or in addition, the first coupling mechanism further includes a stop configured to restrict a range of rotation of the mounting arm.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
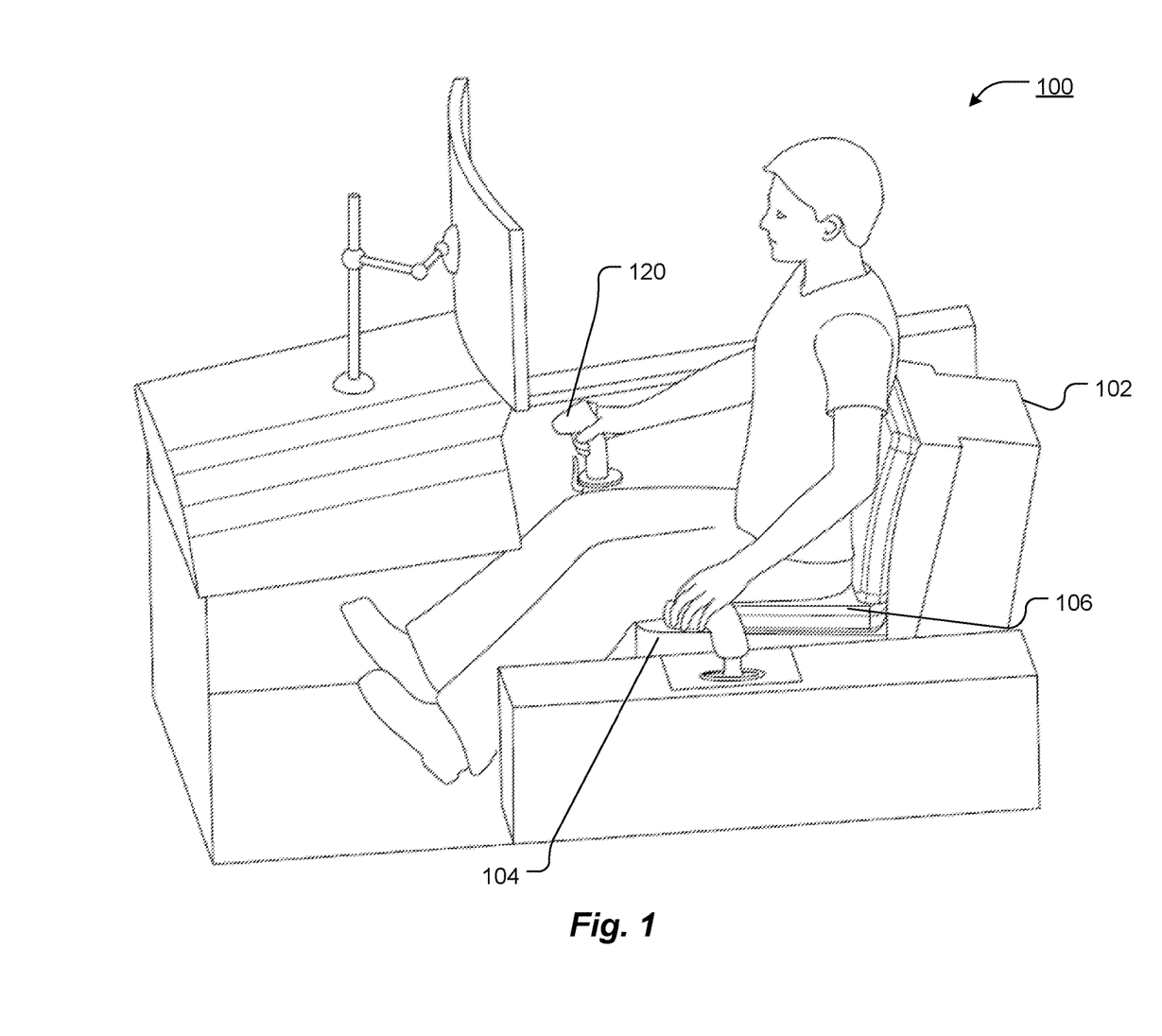
FIG. 1 is a side view of an exemplary flight simulator including an adjustable control structure in accordance with an embodiment of the present invention.

FIG. 1 is a side view of an exemplary flight simulator including an adjustable control structure 100 in accordance with an embodiment of the present invention. The adjustable control structure 100 includes a chair 102 that has a support frame 104 and a seat 106. Exemplarily, the seat is mounted on the support frame, and a user of the flight simulator sits in the chair and on the seat. The adjustable control structure further includes a flight control instrument 120 mounted on a mounting platform (not shown in FIG. 1). The user of the flight simulator operates the flight control instrument 120 to control an aircraft that is simulated by the flight simulator. While only a single flight control instrument 120 is shown here, it is expressly contemplated that additional flight control instruments are provided to allow the user to control additional aspects of the simulated aircraft. The flight simulator may also include a screen. The flight control instrument is exemplarily shown as a joystick. However, any other flight control instrument known to a person having skill in the art may be used and mounted on the mounting platform.

Figure 2:
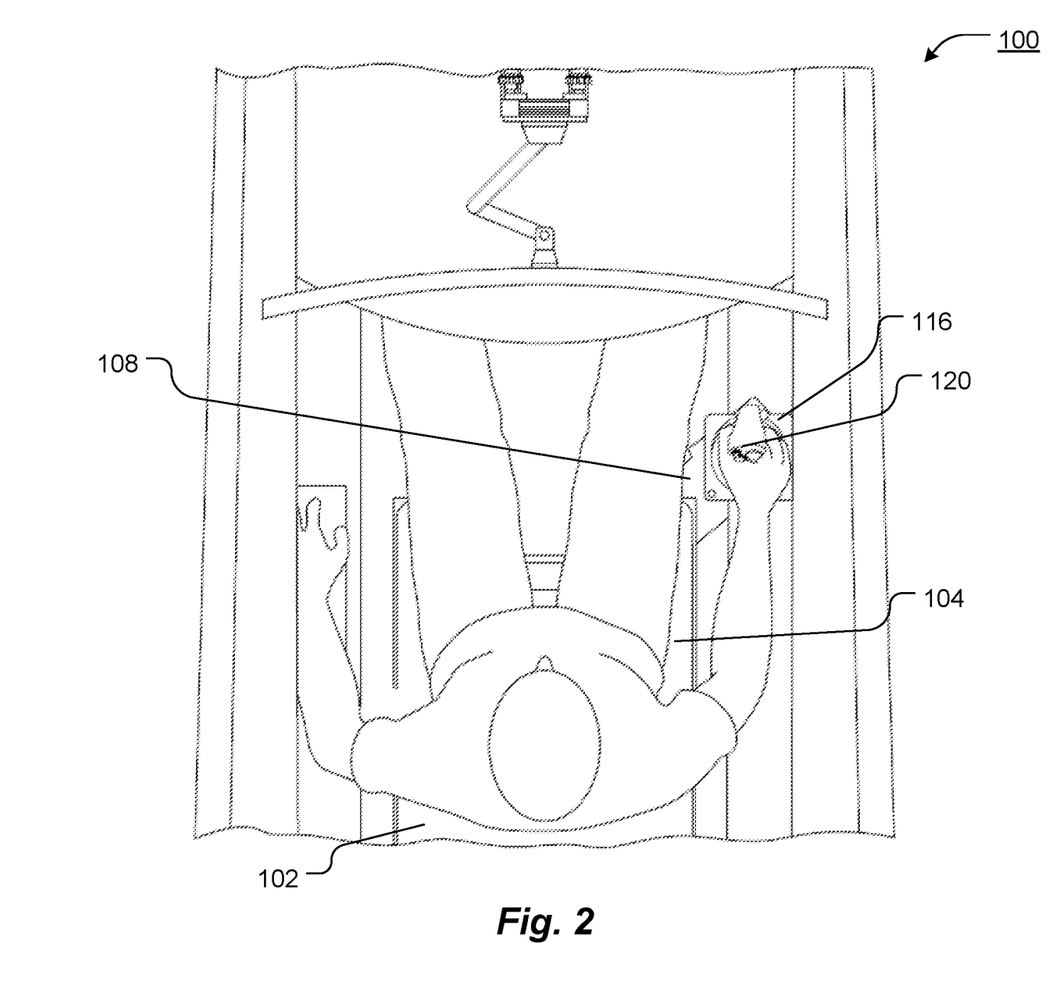
FIG. 2 is a top view of an exemplary flight simulator including an adjustable control structure in accordance with an embodiment of the present invention.

FIG. 2 is a top view of a flight simulator including the adjustable control structure 100. A mounting arm 108 is part of the adjustable control structure 100. The mounting arm 108 has a first end and a second end. The first end is rotatably coupled to the support frame 104 of the chair 102. The second end is rotatably coupled to a mounting platform 116. The mounting platform 116 is configured to receive the flight control instrument 120. The mounting platform 116 may also be configured to receive more than one flight control instrument. In addition, the adjustable control structure 100 may have more than one mounting arm and more than one mounting platform.

Figure 3:
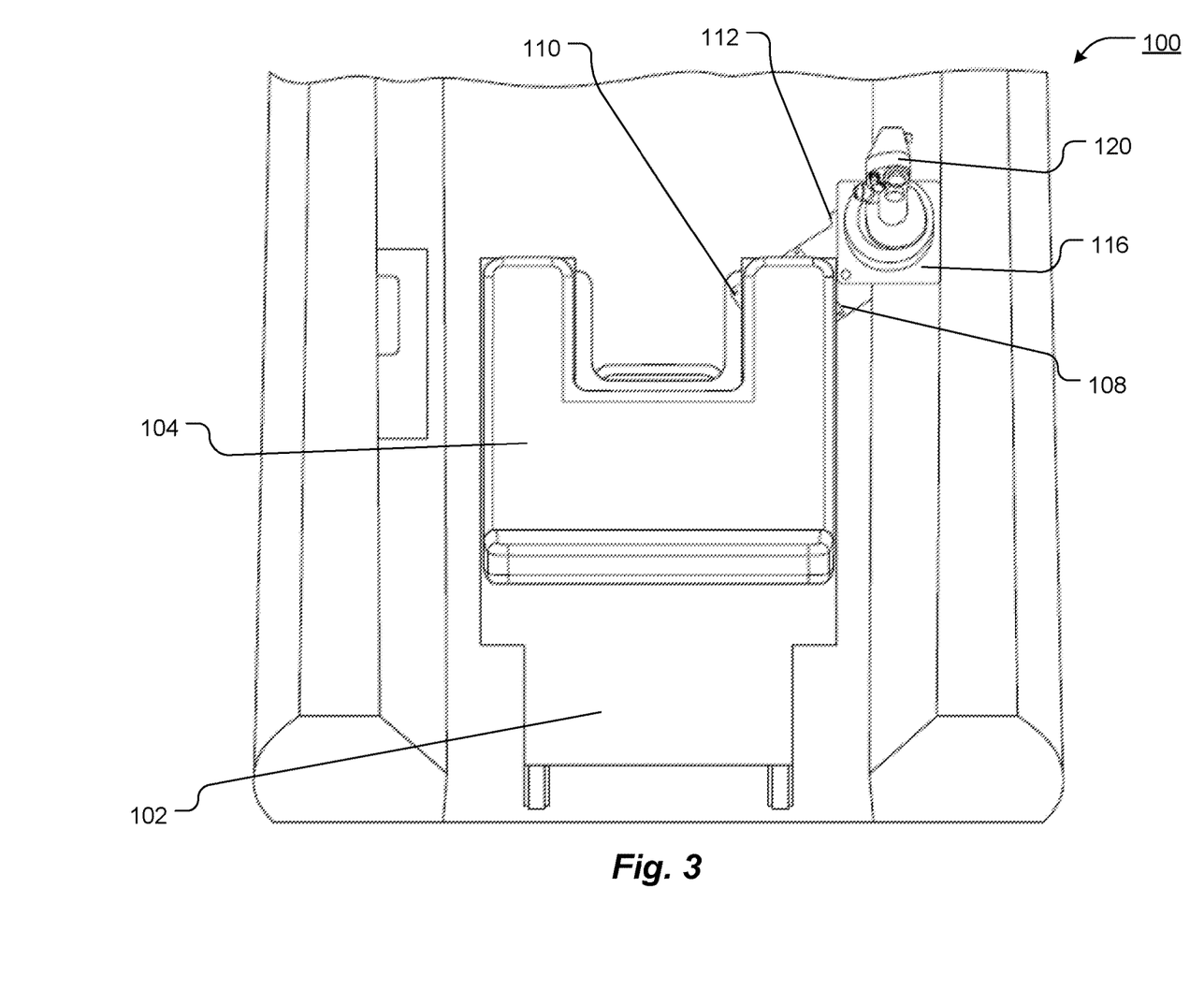
FIG. 3 is a top view of an exemplary flight simulator including an adjustable control structure with a mounting platform in a first position in accordance with an embodiment of the present invention.

FIG. 3 is a top view of a flight simulator including the adjustable control structure 100. The mounting arm 108 is rotatably coupled to the support frame 104 at its first end 110. The second end 112 of the mounting arm 108 is rotatably coupled to the mounting platform 116. A flight instrument 120 is mounted on the mounting platform 116. FIGS. 1, 2, and 3 show the mounting arm 108 locked in a first position. The first position places the mounting platform 116, and therefore the flight control instrument 120 mounted on it, to the right of the user of the flight simulator to simulate a side stick cockpit configuration.

Figure 4:
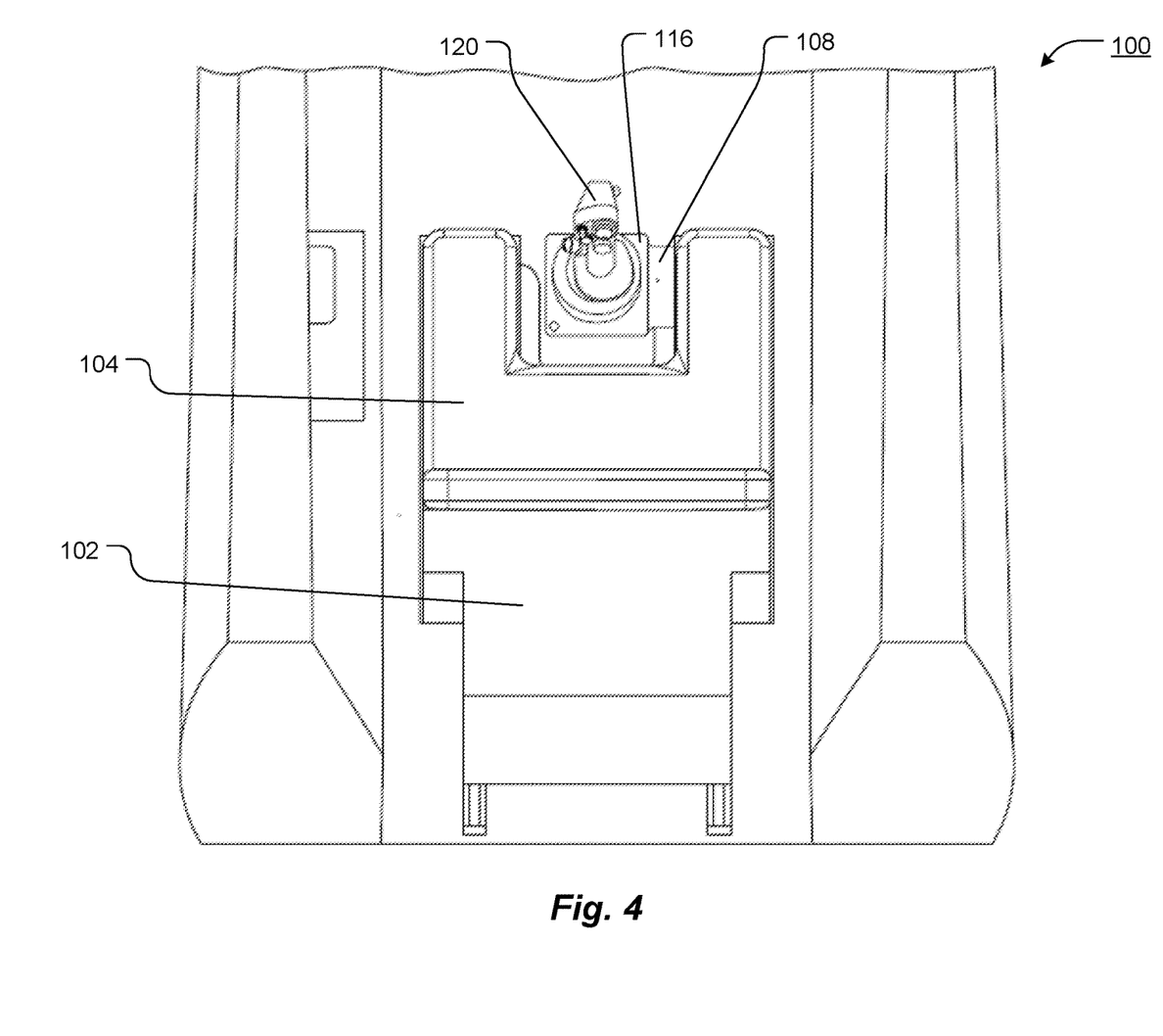
FIG. 4 is a top view of an exemplary flight simulator including an adjustable control structure with a mounting platform in a second position in accordance with an embodiment of the present invention.

FIG. 4 is an additional top view of a flight simulator including the adjustable control structure 100. The mounting arm 108 is now shown in a second position. In the second position, the mounting platform 116, and therefore the flight control instrument 120 mounted on, it are placed in the center of the seat (not shown) so that they are located between the legs of the user of the flight simulator when the user is seated on the seat. The second position therefore simulates a center stick cockpit configuration.

Figure 5:
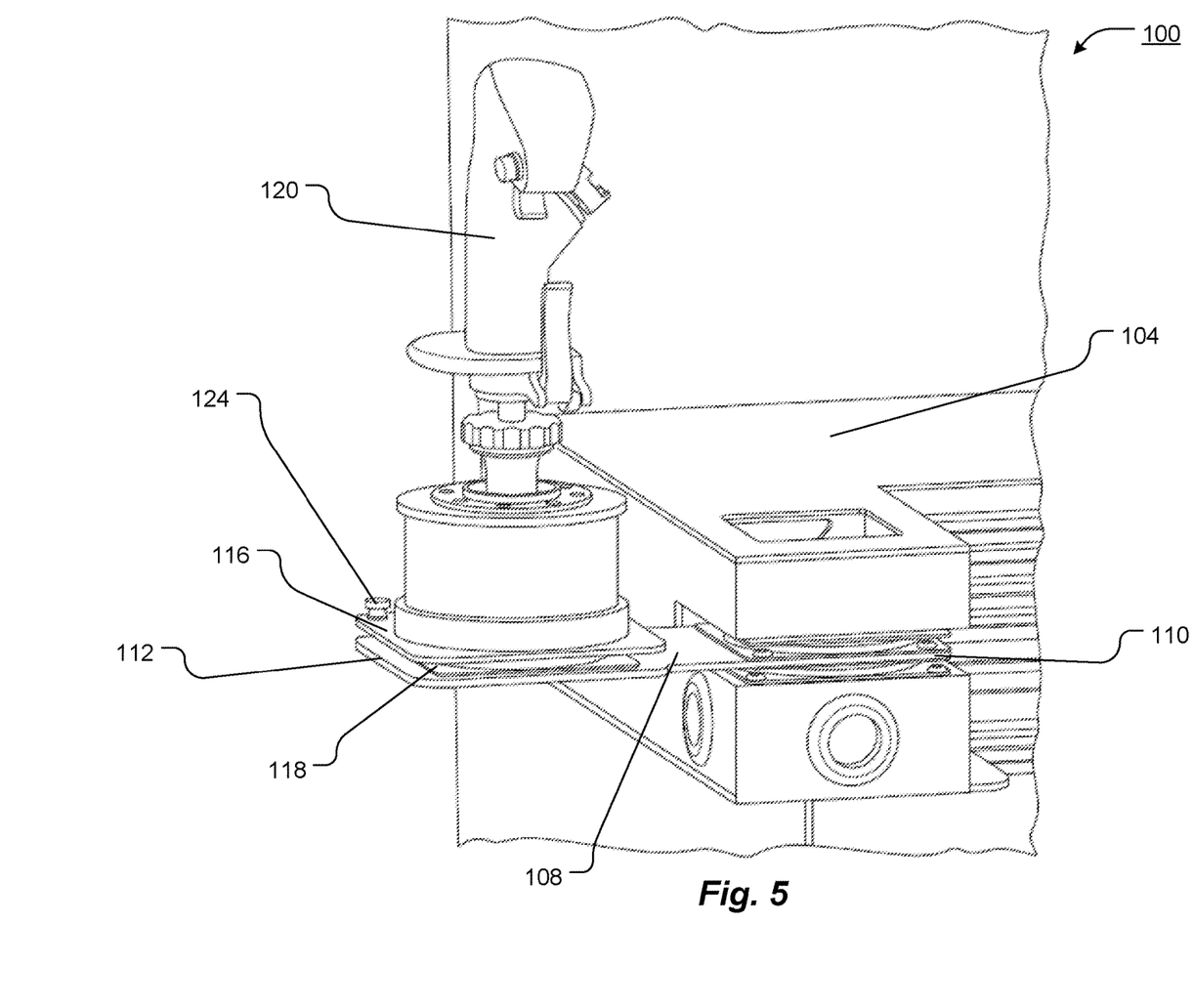
FIG. 5 is a side view of a portion of an adjustable control structure in accordance with an embodiment of the present invention.

FIG. 5 is a side view of a portion of the adjustable control structure 100. As shown in the previous figures, the adjustable control structure 100 includes a mounting arm 108 that has two ends. The first end 110 is rotatably coupled to the support frame 104, and the second end 112 is rotatably coupled to the mounting platform 116. Through this coupling, the mounting arm 108 can be rotated around a first coupling mechanism (shown in FIG. 6) at the first end around an axis substantially normal to a major axis of the support frame 104 and/or the seat 106. The mounting arm 108 also allows the mounting platform 116 to be rotated around a second coupling mechanism 118 around an axis substantially normal to a major axis of the mounting arm 108. A flight control instrument 120, such as a joystick, is mounted on the mounting platform 116.

Figure 6:
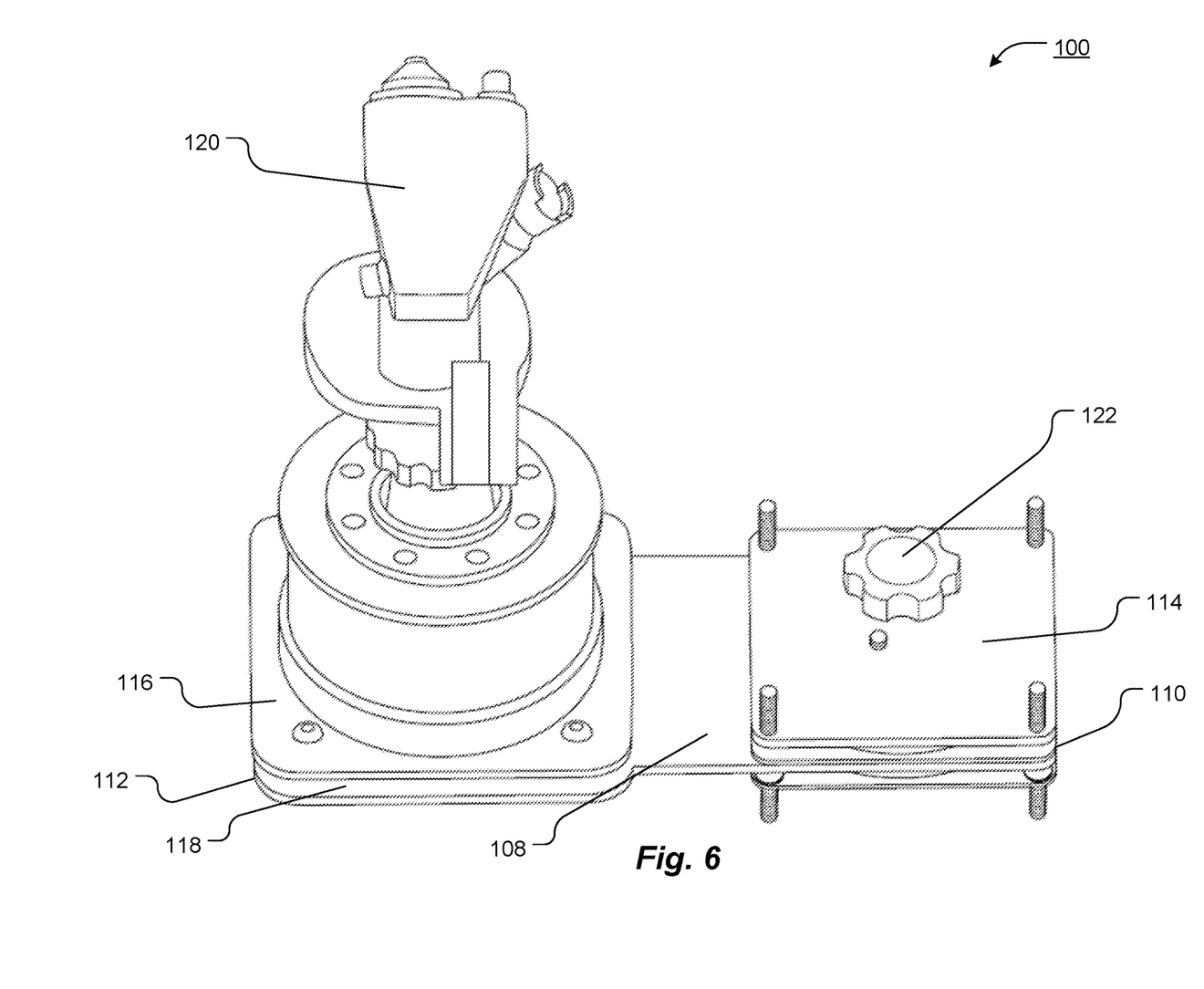
FIG. 6 is a perspective view of a portion of an adjustable control structure in accordance with an embodiment of the present invention.

FIG. 6 is a perspective view of a portion of the adjustable control structure 100. Illustratively, the mounting arm 108 is shown in more detail. At its first end 110, the mounting arm 108 is rotatably coupled to the support frame 104 (not shown) by the first coupling mechanism 114. The first coupling mechanism 114 may include a planar joint, but it also may include any other joint that allows for rotation of the mounting arm 108 around an axis substantially normal to a major axis of the support frame. The first coupling mechanism 114 exemplarily includes a locking member 122 that has a locked position. If the locking member 122 is in the locked position, the locking member 122 is configured to prevent rotation of the mounting arm 108 at the first coupling mechanism 114. If the locking member 122 is not in the locked position, the locking member 122 is configured to allow rotation of the mounting arm 108 at the first coupling mechanism 114. The locking member 122 may be any structure that prevents rotation of the mounting arm. For example, the locking member 122 may be a screw that fixes the first coupling mechanism 114 to the mounting arm 108.

At its second end 112, the mounting arm 108 is rotatably coupled to the mounting platform 116 by a second coupling mechanism 118. The second coupling mechanism 118 may be constructed similar to the first coupling mechanism 114, or it may have a different structure. The second coupling mechanism 118 may include a planar joint, but it may also include any other joint that allows rotation of the mounting platform 116 around an axis substantially normal to a major axis of the mounting arm 108. The second coupling mechanism 118 also includes a locking member 124 (shown in FIG. 5) that has a locked position. If the locking member 124 of the second coupling mechanism 118 is in the locked position, the locking member 124 is configured to prevent rotation of the mounting platform 116 at the second coupling mechanism 118. If the locking member 124 of the second coupling mechanism is not in the locked position, the locking member 124 is configured to allow rotation of the mounting platform 116 at the second coupling mechanism 118. The locking member 124 may be any structure that prevents rotation of the mounting arm. For example, the locking member 124 may be a screw that fixes the mounting platform 116 to the mounting arm 108. Locking members 122 and 124 may have the same structure, e.g., they both may be screws, or they may have different structures.

Figure 7:
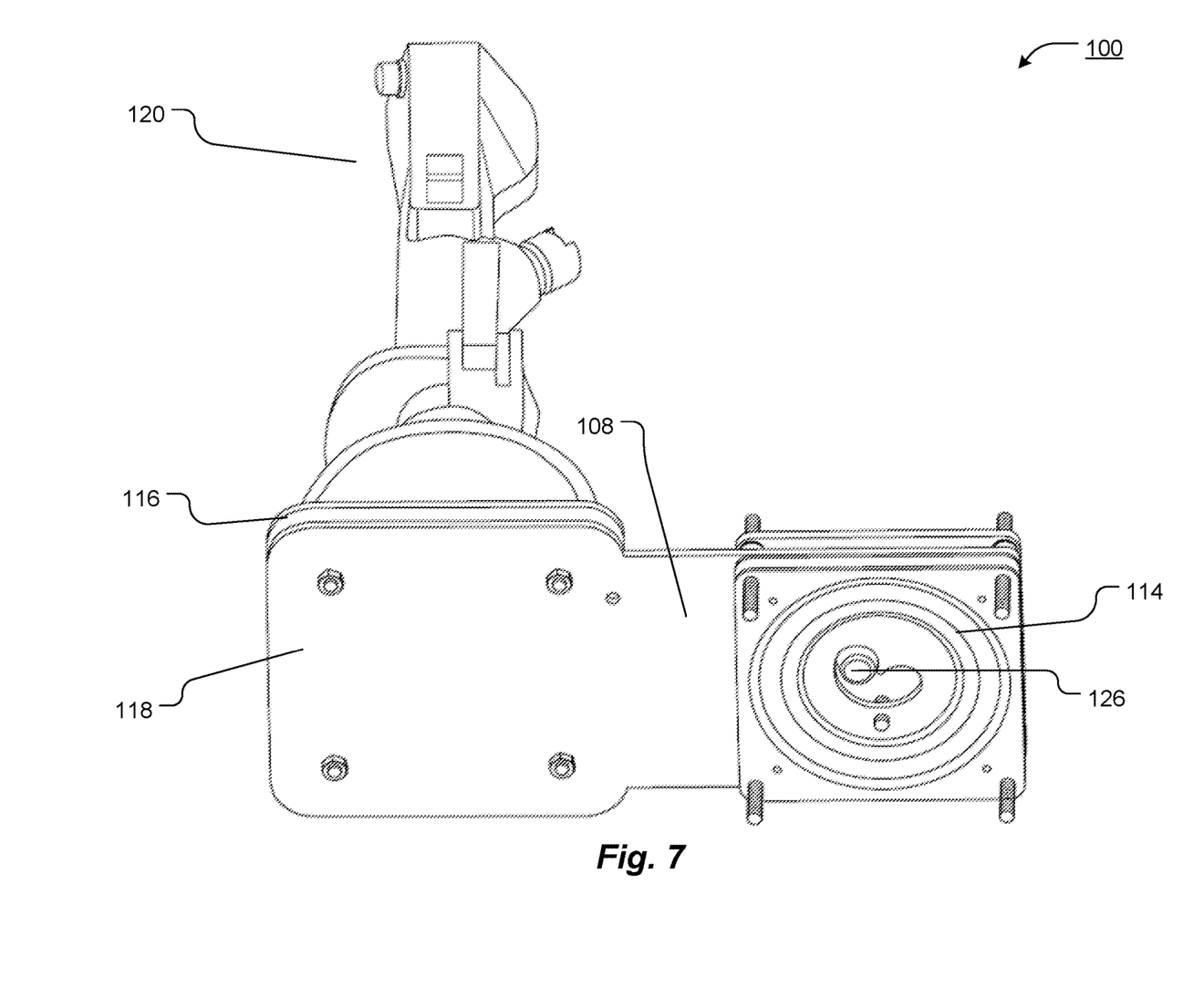
FIG. 7 is a perspective view of a portion of an adjustable control structure in accordance with an embodiment of the present invention.

FIG. 7 is a perspective view of a portion of the adjustable control structure 100. Illustratively, the first coupling mechanism 114 includes a stop 126. The stop 126 may be a rubber bump stop, or it may be any other stop that restricts the range of rotation of the mounting arm 108 at the first coupling mechanism 114. The stop 126 prevents the mounting arm 108 from rotating past a selected location between the legs of the user and/or on the right side of the user. This allows easier adjustment of the mounting arm 108, and it also allows to define one or more preset positions for the mounting arm to simulate the actual location of the flight instrument in the simulated aircraft.

Figure 8:
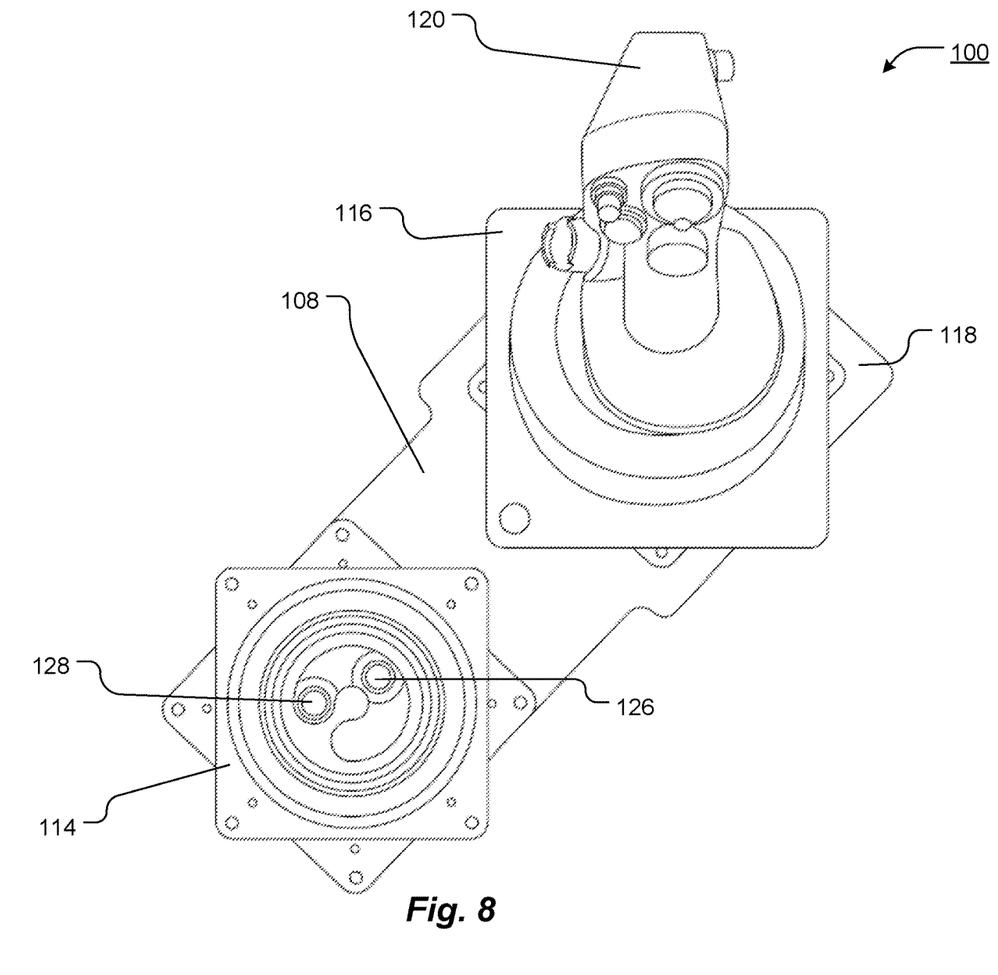
FIG. 8 is a top view of a portion of an adjustable control structure in accordance with an embodiment of the present invention.

FIG. 8 is a top view of a portion of the adjustable control structure 100. Here, the first coupling mechanism 114 includes two stops 126 and 128. The stops 126 and 128 may be rubber bump stops, or they may be any other stops that restrict the range of rotation of the mounting arm 108. As can be seen in FIG. 8, the two stops 126 and 128 restrict the range of rotation of the mounting arm 108 to a range between two positions. Exemplarily, the two positions are a position between the legs of the user and a position to the right of the user. FIG. 8 shows the mounting arm 108 in a first position, with the stop 126 preventing further motion past the first position. The first position here is a position to the right of the user so that the user can operate the flight control instrument 120 with his right hand.

Figure 9:
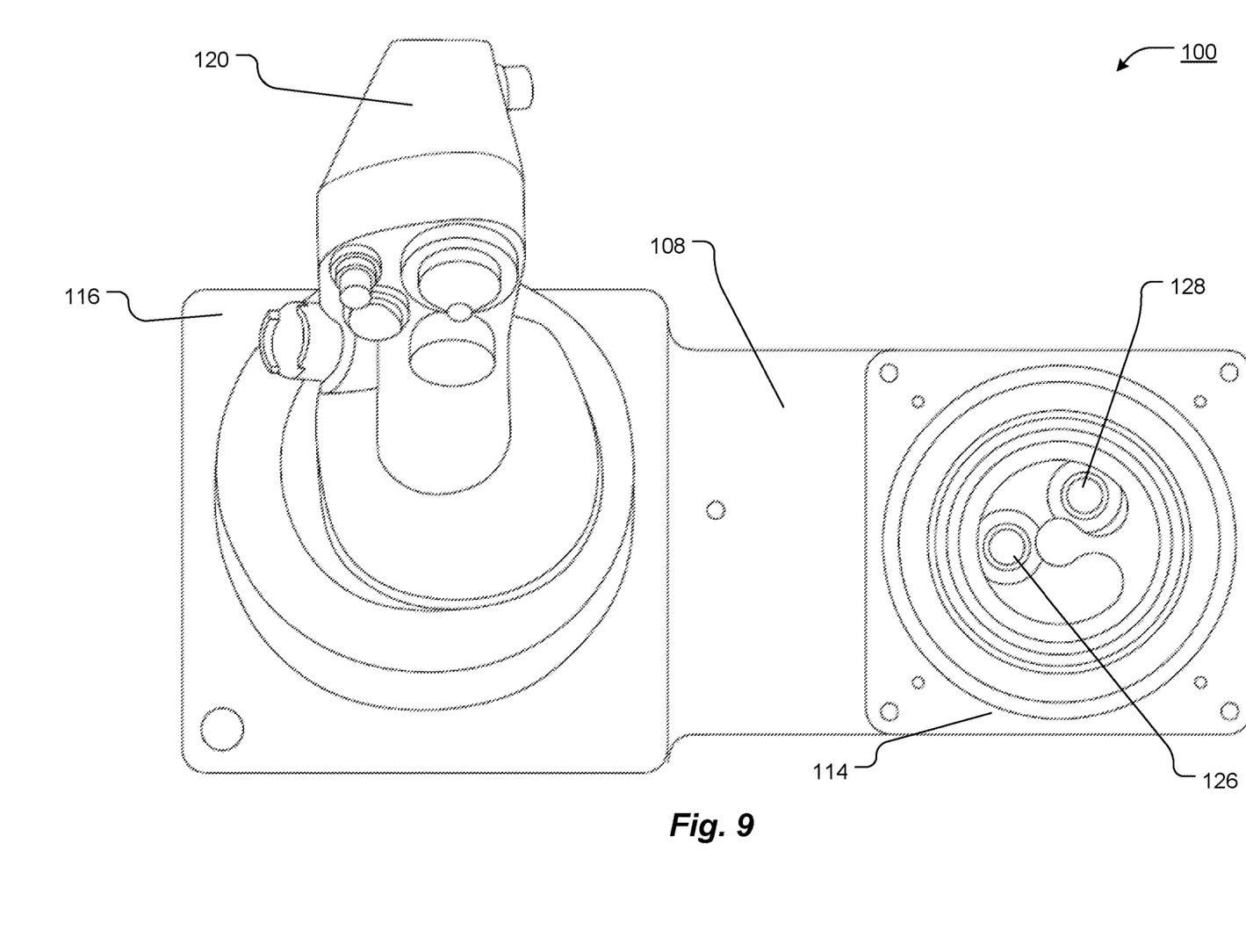
FIG. 9 is a top view of a portion of an adjustable control structure in accordance with an embodiment of the present invention.

FIG. 9 is a top view of a portion of the adjustable control structure 100. Here, the mounting arm 108 is in a second position, with the stop 128 preventing further motion past the second position. The second position here is a position in the center of the seat, between the legs of the user. While not shown in this disclosure, it is expressly contemplated that the second coupling mechanism 118 may also include one or more stops to allow for easy adjustment of the rotation range and position of the mounting platform 116.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An adjustable structure for a flight simulator comprising:
   a chair having a support frame and a seat, the seat having a sitting surface;
   a mounting arm having a first end and a second end, wherein the mounting arm, at a first location of the mounting arm, is rotatably coupled to the support frame beneath the sitting surface by a first coupling mechanism having a planar joint at least partially overlapped by the sitting surface;
   a mounting platform rotatably coupled to the mounting arm at a second location of the mounting arm, displaced from the first location along a length of the mounting arm, by a second coupling mechanism,
   wherein the mounting platform is configured to receive a flight control instrument.

2. The adjustable structure of claim 1, wherein the first coupling mechanism is configured to allow rotation of the mounting arm around an axis normal to a major axis of the seat.

3. The adjustable structure of claim 2, wherein the first coupling mechanism further comprises a stop configured to restrict a range of rotation of the mounting arm.

4. The adjustable structure of claim 1, wherein the second coupling mechanism is configured to allow rotation of the mounting platform around an axis normal to a major axis of the mounting arm.

5. The adjustable structure of claim 1, wherein the first coupling mechanism comprises a locking member having a locked position, the locking member configured to impede rotation of the mounting arm if the locking member is in the locked position, and to allow rotation of the mounting arm if the locking member is not in the locked position.

6. The adjustable structure of claim 1, wherein the second coupling mechanism comprises a locking member having a locked position, the locking member configured to impede rotation of the mounting platform if the locking member is in the locked position, and to allow rotation of the mounting platform if the locking member is not in the locked position.

7. The adjustable structure of claim 1, wherein the second coupling mechanism comprises a planar joint.

8. The adjustable structure of claim 1, wherein the flight control instrument is a joystick.

9. The adjustable structure of claim 1, wherein the seat has a U shape including a rear portion and two leg portions.

10. The adjustable structure of claim 9, wherein the mounting arm is rotatably coupled to the support frame beneath one of the two leg portions.

11. The adjustable structure of claim 10, wherein the mounting arm is rotatably coupled to the support frame to be rotated to a first position with the mounting platform disposed between the leg portions.

12. The adjustable structure of claim 11, wherein the mounting arm is rotatably coupled to the support frame to be rotated to a second position with the mounting platform disposed on an opposite side of one of the leg portions than with the mounting arm in the first position.

* * * * *